(12) United States Patent
Vantomme et al.

(10) Patent No.: US 11,208,504 B2
(45) Date of Patent: Dec. 28, 2021

(54) INJECTION-MOLDED ARTICLES COMPRISING METALLOCENE-CATALYZED POLYETHYLENE RESIN

(71) Applicant: TOTAL RESEARCH & TECHNOLOGY FELUY, Seneffe (BE)

(72) Inventors: Aurélien Vantomme, Mignault (BE); Jean-Léon Gielens, Seneffe (BE); Armelle Sigwald, Nivelles (BE); Christopher Willocq, Bousval (BE)

(73) Assignee: Total Research & Technology Feluy, Seneffe (BE)

( * ) Notice: Subject to any disclaimer, the term of this patent is extended or adjusted under 35 U.S.C. 154(b) by 53 days.

(21) Appl. No.: 16/629,888

(22) PCT Filed: Jul. 11, 2018

(86) PCT No.: PCT/EP2018/068752
§ 371 (c)(1),
(2) Date: Jan. 9, 2020

(87) PCT Pub. No.: WO2019/011967
PCT Pub. Date: Jan. 17, 2019

(65) Prior Publication Data
US 2021/0147586 A1 May 20, 2021

(30) Foreign Application Priority Data
Jul. 11, 2017 (EP) ..................................... 17180771

(51) Int. Cl.
*C08F 10/02* (2006.01)
*C08F 4/6592* (2006.01)
(Continued)

(52) U.S. Cl.
CPC ...... *C08F 4/65927* (2013.01); *B29C 45/0001* (2013.01); *C08F 2/001* (2013.01);
(Continued)

(58) Field of Classification Search
None
See application file for complete search history.

(56) References Cited

U.S. PATENT DOCUMENTS 9,340,631 B2   5/2016  Willocq et al.
2012/0130027 A1*  5/2012  Standaert ............. C08F 210/16
                                              526/64

FOREIGN PATENT DOCUMENTS

EP   2451851 B1   9/2015
WO   2008113680 A1   9/2008

OTHER PUBLICATIONS

International Organization for Standardization. (2011). Plastics—Determination of the melt mass-flow rate (MFR) and melt volumeflow rate (MVR) of thermoplastics—Part 1: Standard method (ISO 1133-1). (Year: 2011).*

(Continued)

*Primary Examiner* — Richard A Huhn
(74) *Attorney, Agent, or Firm* — Albert Shung

(57) ABSTRACT

The present invention relates to an injection-molded article, comprising at least one metallocene-catalyzed polyethylene resin comprising at least two metallocene-catalyzed polyethylene fractions A and B, wherein the at least one metallocene-catalyzed polyethylene resin comprises:
at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133, condition D, at 190° C. and under a load of 2.16 kg; and (Continued)

wherein the at least one metallocene-catalyzed polyethylene resin has a density of at least 0.940 g/cm³ to at most 0.950 g/cm³ as measured on pellets according to ISO 1183 at 23° C.; a melt index MI2 of at least 1.4 g/10 min to at most 2.5 g/10 min as measured on pellets according to ISO 1133, condition D, at 190° C. and under a load of 2.16 kg.

The present invention also relates to a process for preparing said injection-molded article, comprising the steps of a) providing at least one metallocene-catalyzed polyethylene resin as described herein; and b) injection-molding said polyethylene resin into an article.

15 Claims, 2 Drawing Sheets

(51) Int. Cl.
    *B29C 45/00*     (2006.01)
    *C08F 2/00*     (2006.01)
    *C08L 23/08*     (2006.01)
    *C08F 110/02*     (2006.01)
    *C08F 210/02*     (2006.01)

(52) U.S. Cl.
    CPC .......... *C08L 23/0815* (2013.01); *C08F 10/02* (2013.01); *C08F 110/02* (2013.01); *C08F 210/02* (2013.01); *C08L 2205/025* (2013.01); *C08L 2207/062* (2013.01); *C08L 2314/06* (2013.01)

(56) References Cited

OTHER PUBLICATIONS

International Organization for Standardization. (2000). Plastics—Determination of the melt mass-flow rate (MFR) and melt volume flow rate (MVR) of thermoplastics (ISO 1133:1997). English version, EN ISO 1133:1999. (Year: 2000).*

International Search Report issued in Application No. PCT/EP2018/068752, dated Oct. 4, 2018, 3 pages.

* cited by examiner

INJECTION-MOLDED ARTICLES COMPRISING METALLOCENE-CATALYZED POLYETHYLENE RESIN

CROSS-REFERENCE TO RELATED APPLICATIONS

This application claims the benefit of PCT/EP2018/068752 filed Jul. 11, 2018, which claims priority from EP 17180771.2 filed Jul. 11, 2017, which are incorporated herein by reference in their entireties for all purposes.

FIELD OF THE INVENTION

The present invention relates to injection-molded articles comprising a metallocene-catalyzed polyethylene resin, and to the manufacture of such article. In particular the present invention relates to fuel tanks comprising polyethylene and to the manufacture of such tanks.

BACKGROUND OF THE INVENTION

Automobile fuel tanks comprising high density polyethylene are known. Such fuel tanks are usually produced by blow moulding. Plastics automobile fuel tanks are required to exhibit high safety performance, particularly with regard to fire resistance and impact resistance. Such fuel tanks are required to meet minimum statutory industry specified performance criteria both with respect to creep resistance when the tank is subjected to a fire and crash test resistance when the tank is subjected to an impact. An automobile fuel tank for use in Europe is required to have a fire resistance and an impact resistance both complying with the respective standards defined in ECE34.

In order to meet these standards, known blow moulded automobile fuel tanks are required by automobile manufacturers to have a minimum wall thickness of at least 3 mm so as to provide sufficient impact strength and creep resistance for the fuel tank as a whole. An automobile fuel tank composed of polyethylene typically has a volume of up to about 100 liters, or even greater.

The requirement for such volumes in combination with the need for progressively lower wall thicknesses places a high demand on the physical properties of the walls of the tank, both following manufacture and during end use. Thus the walls of the fuel tank are required not to warp or shrink following their manufacture, and are required to have a precisely defined shape and rigidity during use.

The use of an injection moulded process would enable far more complicated geometric structures to be produced than conventional blow moulding processes. However it is believed that the physical properties discussed above would not be suitable in an injection-moulded fuel tank. Current common polyethylene grades intended for injection moulding do not meet high mechanical properties requirements needed for automobile fuel tanks (Environmental Stress Cracking Resistance (ESCR), Cold Impact Resistance, . . . )

Thus, there is an ongoing need to develop injection-molded articles that display resistance to the development of cracks or breaks. Hydrocarbon containers and fuel containers for non-automobile applications likewise frequently require improved physical characteristics and may be subject to various statutory and/or industry requirements. Accordingly, hydrocarbon and fuel containers exhibiting good environmental stress crack resistance, creep resistance and impact resistance are desirable.

It is therefore an object of the present invention to provide injection-molded articles comprising polyethylene resin having improved mechanical properties and improved processability.

SUMMARY OF THE INVENTION

According to a first aspect, the present invention provides an injection-molded article, comprising at least one metallocene-catalyzed polyethylene resin comprising at least two metallocene-catalyzed polyethylene fractions A and B, wherein the at least one metallocene-catalyzed polyethylene resin comprises:

at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133, condition D, at 190° C. and under a load of 2.16 kg; and wherein the at least one metallocene-catalyzed polyethylene resin has a density of at least 0.940 g/cm$^3$ to at most 0.950 g/cm$^3$ as measured on pellets according to ISO 1183 at 23° C.; a melt index MI2 of at least 1.4 g/10 min to at most 2.5 g/10 min as measured on pellets according to ISO 1133, condition D, at 190° C. and under a load of 2.16 kg.

The present invention also relates to a process for preparing an injection-molded article according to the first aspect of the invention, comprising the steps of a) providing at least one metallocene-catalyzed polyethylene resin as described herein; and b) injection-molding said polyethylene resin into an article.

The present inventors have shown that present injection-molded articles such as hydrocarbon and fuel containers exhibit improved creep resistance and stiffness, while maintaining good toughness, stress cracking resistance, impact resistance, low warpage and shrinkage.

The independent and dependent claims set out particular and preferred features of the invention.

Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
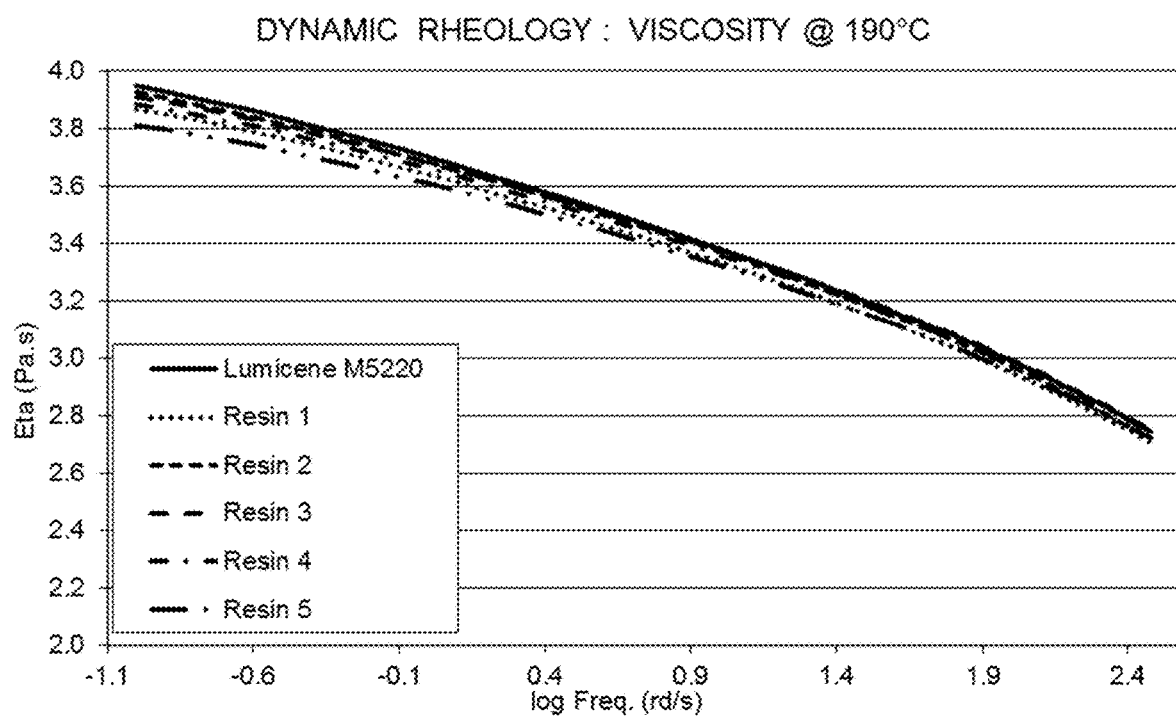
FIG. 1 represents a rheometric dynamic analysis ("RDA") graph plotting viscosity as a function of shear rate for two polyethylene articles according to embodiments of the present invention, and two comparative examples.

When describing the invention, the terms used are to be construed in accordance with the following definitions, unless a context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

Preferred statements (features) and embodiments of the articles, resins and uses of this invention are set herein below. Each statement and embodiment of the invention so defined may be combined with any other statement and/or embodiment unless clearly indicated to the contrary.

In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 29, with any other statement and/or embodiments.

1. A injection-molded article comprising at least one metallocene-catalyzed polyethylene resin, said at least one resin comprising at least two metallocene-catalyzed polyethylene fractions A and B, wherein the at least one metallocene-catalyzed polyethylene resin comprises:
   at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133, condition D, at 190° C. and under a load of 2.16 kg, and/or fraction A has a melt index MI105 of at least was 13.0 g/10 min as determined according to ISO 1133, condition D, at 190° C. and under a load of 2.16 kg, using a die having a diameter of 1.05 mm and a height of 4 mm; and
   wherein the at least one metallocene-catalyzed polyethylene resin has a density of at least 0.940 g/cm$^3$ to at most 0.950 g/cm$^3$ as measured on pellets according to ISO 1183 at 23° C.; a melt index MI2 of at least 1.4 g/10 min to at most 2.5 g/10 min as measured on pellets according to ISO 1133, condition D, at 190° C. and under a load of 2.16 kg.

2. A injection-molded article comprising at least one metallocene-catalyzed polyethylene resin, said at least one resin comprising at least two metallocene-catalyzed polyethylene fractions A and B, wherein the at least one metallocene-catalyzed polyethylene resin comprises:
   at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133, condition D, at 190° C. and under a load of 2.16 kg; and
   wherein the at least one metallocene-catalyzed polyethylene resin has a density of at least 0.940 g/cm$^3$ to at most 0.950 g/cm$^3$ as measured on pellets according to ISO 1183 at 23° C.; a melt index MI2 of at least 1.4 g/10 min to at most 2.5 g/10 min as measured on pellets according to ISO 1133, condition D, at 190° C. and under a load of 2.16 kg.

3. A injection-molded article comprising at least one metallocene-catalyzed polyethylene resin, said at least one resin comprising at least two metallocene-catalyzed polyethylene fractions A and B, wherein the at least one metallocene-catalyzed polyethylene resin comprises:
   at least 40% to at most 50% by weight of polyethylene fraction A based on the total weight of the at least one metallocene-catalyzed polyethylene resin, wherein fraction A has a melt index MI105 of at least 13.0 g/10 min as determined according to ISO 1133, condition D, at 190° C. and under a load of 2.16 kg, using a die having a diameter of 1.05 mm and a height of 4 mm; and
   wherein the at least one metallocene-catalyzed polyethylene resin has a density of at least 0.940 g/cm$^3$ to at most 0.950 g/cm$^3$ as measured on pellets according to ISO 1183 at 23° C.; a melt index MI2 of at least 1.4 g/10 min to at most 2.5 g/10 min as measured on pellets according to ISO 1133, condition D, at 190° C. and under a load of 2.16 kg.

4. The injection-molded article according to any one of statements 1 to 3, wherein the at least one metallocene-catalyzed polyethylene resin has a density of at least 0.941 g/cm$^3$, preferably at least 0.942 g/cm$^3$, preferably at least 0.943 g/cm$^3$, preferably at least 0.944 g/cm$^3$, as measured on pellets according to ISO 1183 at 23° C.

5. The injection-molded article according to any one of statements 1 to 4, wherein the at least one metallocene-catalyzed polyethylene resin has a density of at least 0.941 g/cm$^3$ to at most 0.950 g/cm$^3$, preferably at least 0.942 g/cm$^3$ to at most 0.950 g/cm$^3$, preferably at least 0.943 g/cm$^3$ to at most 0.950 g/cm$^3$, preferably at least 0.944 g/cm³ to at most 0.950 g/cm³, as measured on pellets according to ISO 1183 at 23° C.
6. The injection-molded article according to any one of statements 1 to 5, wherein the at least one metallocene-catalyzed polyethylene resin has and a melt index MI2 of at least 1.5 g/10 min to at most 2.5 g/10 min as measured on pellets according to ISO 1133, condition D, at 190° C. and under a load of 2.16 kg.
7. The injection-molded article according to any one of statements 1 to 6, wherein the at least one metallocene-catalyzed polyethylene resin has a molecular weight distribution $M_w/M_n$ of at least 4.0 to at most 6.0, with $M_w$ being the weight-average molecular weight and $M_n$ being the number-average molecular weight, as determined by gel permeation chromatography, preferably the at least one metallocene-catalyzed polyethylene resin has a molecular weight distribution $M_w/M_n$ of at least 4.1 to at most 5.5, for example of at least 4.2 to at most 5.5, preferably of at least 4.3 to at most 5.4, preferably of at least 4.4 to at most 5.4, preferably of at least 4.4 to at most 5.3, preferably of at least 4.4 to at most 5.2.
8. The injection-molded article according to any one of statements 1 to 7, wherein the at least one metallocene-catalyzed polyethylene resin has an HLMI of at least 50.0 g/10 min, preferably of at least 60.0 g/10 min, preferably of at least 65.0 g/10 min, preferably of at least 70.0 g/10 min, as measured according to ISO 1133:1997 condition G at 190° C. and under a load of 21.6 kg.
9. The injection-molded article according to any one of statements 1 to 8, wherein fraction A of the at least one metallocene-catalyzed polyethylene resin has a density as measured on the fluff at least 0.005 g/cm³ higher than the density of the at least one metallocene-catalyzed polyethylene resin; preferably has a density at least 0.010 g/cm³ higher than the density of the at least one metallocene-catalyzed polyethylene resin, preferably at least 0.015 g/cm³ higher, preferably at least 0.020 g/cm³ higher than the density of the at least one metallocene-catalyzed polyethylene resin, wherein the density is measured according to ISO 1183 at 23° C.
10. The injection-molded article according to any one of statements 1 to 9, wherein fraction A of the at least one metallocene-catalyzed polyethylene resin has a density as measured on the fluff of at least 0.960 g/cm³, preferably of at least 0.965 g/cm³, preferably of at least 0.970 g/cm³ as determined according to ISO 1183 at 23° C.
11. The injection-molded article according to any one of statements 1 to 10, wherein polyethylene fraction A of the at least one metallocene-catalyzed polyethylene resin has a melt index MI2 as measured on the fluff of at least 100.0 g/10 min, preferably at least 110.0 g/10 min, preferably at least 120.0 g/10 min, preferably at least 130.0 g/10 min, preferably at least 140.0 g/10 min, preferably at least 150.0 g/10 min, preferably at least 155.0 g/10 min as determined according to ISO 1133, condition D, at 190° C. and under a load of 2.16 kg.
12. The injection-molded article according to any one of statements 1 to 11, wherein polyethylene fraction A of the at least one metallocene-catalyzed polyethylene resin has a melt index MI105 as measured on the fluff of at least 13.0 g/10 min, preferably at least 14.0 g/10 min, preferably at least 15.0 g/10 min, preferably at least 18.0 g/10 min, preferably at least 20.0 g/10 min, preferably at least 23.0 g/10 min, as determined according to ISO 1133, condition D, at 190° C. and under a load of 2.16 kg, using a die having a diameter of 1.05 mm and a height of 4 mm.
13. The injection-molded article according to any one of statements 1 to 12, wherein the at least one metallocene-catalyzed polyethylene resin comprises from 41% to at most 50% by weight of polyethylene fraction A based on the total weight of the at least one metallocene-catalyzed polyethylene resin, for example from 42.0% to at most 50.0% by weight, for example from 42.0% to at most 49.0% by weight, preferably from 42.0% to at most 48.0% by weight, for example from 43.0% to at most 50.0% by weight, for example from 43.0% to at most 49.0% by weight, for example from 43.0% to at most 48.0% by weight.
14. The injection-molded article according to any one of statements 1 to 13, wherein the at least one metallocene-catalyzed polyethylene resin has a multimodal molecular weight distribution, and preferably wherein said at least one metallocene-catalyzed polyethylene resin has a bimodal molecular weight distribution.
15. The injection-molded article according to any one of statements 1 to 14, wherein each fraction of said at least one metallocene-catalyzed polyethylene resin is prepared in different reactors of at least two reactors connected in series, preferably at least two loop reactors connected in series, preferably at least two slurry loop reactors connected in series.
16. The injection-molded article according to any one of statements 1 to 15, wherein the at least one metallocene-catalyzed polyethylene resin is prepared using a process comprising the steps of:
  (a) feeding ethylene monomer, a diluent, at least one metallocene catalyst, optionally hydrogen, and optionally one or more olefin co-monomers into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction A; and
  (b) feeding the first polyethylene fraction A to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.
17. The injection-molded article according to any one of statements 1 to 16, wherein said at least one metallocene-catalyzed polyethylene resin is prepared using a process comprising the steps of:
  (a) feeding ethylene monomer, a diluent, at least one metallocene catalyst, optionally hydrogen, and optionally one or more olefin co-monomers, into at least one first slurry loop reactor; polymerizing the ethylene monomer, in the presence of the metallocene catalyst, and optional hydrogen, in said first slurry loop reactor to produce a first polyethylene fraction A; and
  (b) feeding the first polyethylene fraction A to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the metallocene catalyzed-polyethylene resin.
18. The injection-molded article according to any one of statements 1 to 17, wherein fraction A of said at least one metallocene-catalyzed polyethylene resin is an ethylene homopolymer and fraction B of said at least one metallocene-catalyzed polyethylene resin is an ethylene copolymer.
19. The injection-molded article according to any one of statements 1 to 18, wherein the article is a tank, a drum, a container, a bin, a vat, a jerrycan, a can, a cistern, slosh baffle, a connector, a cap or closure, or any other injected component.
20. The injection-molded article according to any one of statements 1 to 19, wherein the article is an automotive fuel tank.
21. The injection-molded article according to any one of statements 1 to 20, wherein the article is a Selective Catalytic Reduction (SCR) tank, or an AdBlue® tank.
22. A process for preparing an injection-molded article according to any one of statements 1 to 21, comprising the steps of a) providing at least one metallocene-catalyzed polyethylene resin as described in any one of statements 1 to 18; and b) injection-molding said polyethylene resin into an article.
23. An automotive tank comprising at least one metallocene-catalyzed polyethylene resin, said at least one resin comprising at least two metallocene-catalyzed polyethylene fractions A and B, wherein the at least one metallocene-catalyzed polyethylene resin comprises: at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133, condition D, at 190° C. and under a load of 2.16 kg, and/or fraction A has a melt index MI105 of at least was 13.0 g/10 min as determined according to ISO 1133, condition D, at 190° C. and under a load of 2.16 kg, using a die having a diameter of 1.05 mm and a height of 4 mm; and
wherein the at least one metallocene-catalyzed polyethylene resin has a density of at least 0.940 g/cm$^3$ to at most 0.950 g/cm$^3$ as measured on pellets according to ISO 1183 at 23° C.; a melt index MI2 of at least 1.4 g/10 min to at most 2.5 g/10 min as measured on pellets according to ISO 1133, condition D, at 190° C. and under a load of 2.16 kg.
24. The automotive tank according to statement 23 comprising at least one metallocene-catalyzed polyethylene resin as described in any one of statements 1 to 18.
25. The automotive tank according to any one of statements 23 to 24, comprising at least two parts, which have been joined together to form said tank having a wall defining a chamber, at least one of the parts being injection-molded from at least one metallocene-catalyzed polyethylene resin as described in any one of statements 1 to 18.
26. The automotive tank according to any one of statements 23 to 25, which comprises two of the injection moulded parts that have been joined together.
27. The automotive tank according to any one of statements 23 to 26, wherein the two parts have been joined together by welding.
28. The automotive tank according to any one of statements 23 to 27, which is an automotive fuel tank.
29. The automotive tank according to any one of statements 23 to 28, which is a Selective Catalytic Reduction (SCR) tank, or an AdBlue® tank.

The present invention relates to an injection-molded article, prepared with a composition comprising at least one metallocene-catalyzed polyethylene resin as described herein comprising at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133, condition D, at 190° C. and under a load of 2.16 kg, and/or fraction A has a melt index MI105 of at least 13.0 g/10 min as determined according to ISO 1133, condition D, at 190° C. and under a load of 2.16 kg, using a die having a diameter of 1.05 mm and a height of 4 mm; and wherein the at least one metallocene-catalyzed polyethylene resin has a density measured on pellets of at least 0.940 g/cm$^3$ to at most 0.950 g/cm$^3$ as determined according to ISO 1183 at 23° C.; a melt index MI2 measured on pellets of at least 1.4 g/10 min to at most 2.5 g/10 min as determined according to ISO 1133, condition D, at 190° C. and under a load of 2.16 kg.

For "comprising", it is preferably meant here that the said injection-moulded article comprises from 50% to 100% by weight of the at least one metallocene-catalyzed polyethylene resin.

The term "polyethylene resin" as used herein refers to the polyethylene fluff or powder that is extruded, and/or melted and pelleted and can be produced through compounding and homogenizing of the polyethylene resin as taught herein, for instance, with mixing and/or extruder equipment. The measures of density and melt index of the metallocene-catalyzed polyethylene resin, given in the claims, are performed on the pelleted form. Under normal production conditions in a production plant it is expected that the melt index MI2 will be higher for the fluff, compared to the resin (pellets).

The term "fluff" or "powder" as used herein refers to the polyethylene material with the hard catalyst particle at the core of each grain and is defined as the material after it exits the polymerization reactor (or final polymerization reactor in the case of multiple reactors connected in series) but not pelleted, extruded and/or melted. The measures of density and melt index of fraction A of the metallocene-catalyzed polyethylene resin, given in the claims, are performed on the fluff.

In some embodiments, fraction A has a density as measured on the polymer material after it exits the polymerization reactor (fluff) at least 0.008 g/cm$^3$ higher than the density of the polyethylene resin, preferably at least 0.013 g/cm$^3$ higher, preferably at least 0.018 g/cm$^3$ higher, preferably at least 0.023 g/cm$^3$ higher than the density of the at least one metallocene-catalyzed polyethylene resin according to ISO 1183 at 23° C. In some embodiments, fraction A has a density as measured on the polymer material after it exits the polymerization reactor of at least 0.963 g/cm$^3$; preferably of at least 0.967 g/cm$^3$, preferably of at least 0.970 g/cm$^3$ according to ISO 1183 at 23° C.

In a preferred embodiment, the at least one metallocene-catalyzed polyethylene resin suitable for use in the injection-molded article has a multimodal molecular weight distribution. In some embodiments, the metallocene-catalyzed polyethylene resin has a bimodal molecular weight distribution.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin can have an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weights, as defined above, for example when the two distinct populations were prepared in different reactors and/or under different conditions.

In some embodiment, the at least one metallocene-catalyzed polyethylene resin for use in the injection-molded article has a multimodal, preferably bimodal, molecular weight distribution. The at least one metallocene-catalyzed polyethylene resin suitable for use in the injection-molded article can be produced by polymerizing ethylene and one or more optional comonomers, optionally hydrogen, in the presence of a metallocene catalyst system.

As used herein, the term "catalyst" refers to a substance that causes a change in the rate of a polymerization reaction. In the present invention, it is especially applicable to catalysts suitable for the polymerization of ethylene to polyethylene. The present invention especially relates to polyethylene prepared in the presence of metallocene catalyst. As used herein, the terms "metallocene-catalyzed polyethylene resin", and "metallocene-catalyzed polyethylene" are synonymous and used interchangeably and refers to a polyethylene prepared in the presence of a metallocene catalyst.

The term "metallocene catalyst" is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In one embodiment of the present invention, the metallocene catalyst is a compound of formula (I) or (II)

$(Ar)_2MQ_2$  (I);

or $R"(Ar)_2MQ_2$ 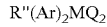 (II), wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, $SiR_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;
wherein M is a transition metal selected from the group consisting of titanium, zirconium, hafnium, and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl, and P; and
wherein R" is a divalent group or moiety bridging the two Ar groups and selected from the group consisting of $C_1$-$C_{20}$ alkylene, germanium, silicon, siloxane, alkylphosphine, and an amine, and wherein said R" is optionally substituted with one or more substituents each independently selected from the group consisting of halogen, hydrosilyl, $SiR_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl, and P.

Preferably, the metallocene comprises a bridged bis-indenyl and/or a bridged bis-tetrahydrogenated indenyl component. In some embodiments, the metallocene can be selected from one of the following formula (IIIa) or (IIIb):

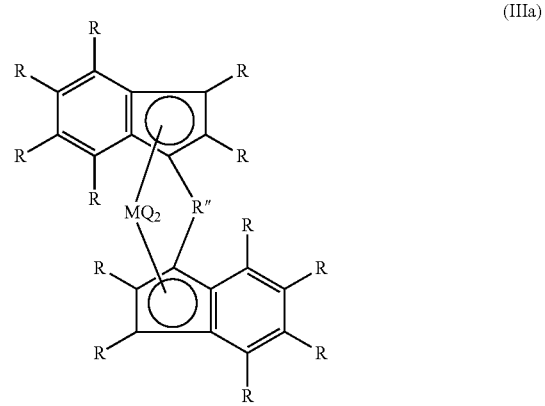

(IIIa)

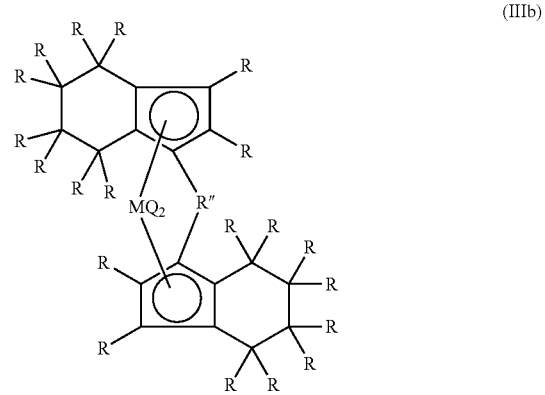

(IIIb)

wherein each R in formula (IIIa) or (IIIb) is the same or different and is selected independently from hydrogen or $XR'_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents $XR'_v$ on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by a aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methyl propylene (—$CH_2$—$CH$ ($CH_3$)—$CH_2$—), 3-methylpropylene (—$CH_2$—$CH_2$—$CH$ ($CH_3$)—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-alumina. Most preferred is a silica compound. In a preferred embodiment, the metallocene catalyst is provided on a solid support, preferably a silica support. The silica may be in granular, agglomerated, fumed or other form.

In some embodiments, the support of the metallocene catalyst is a porous support, and preferably a porous silica support having a surface area comprised between 200 m$^2$/g and 900 m$^2$/g. In another embodiment, the support of the polymerization catalyst is a porous support, and preferably a porous silica support having an average pore volume comprised between 0.5 ml/g and 4 ml/g. In yet another embodiment, the support of the polymerization catalyst is a porous support, and preferably a porous silica support having an average pore diameter comprised between 50 Å and 300 Å, and preferably between 75 Å and 220 Å.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In some embodiments, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In some embodiments, alumoxanes comprise oligomeric linear and/or cyclic alkyl alumoxanes. In a further embodiment, the alumoxane has formula (IV) or (V)

$R^a$—(Al($R^a$)—O)$_x$—AlR$^a_2$ (IV) for oligomeric, linear alumoxanes; or (—Al($R^a$)—O—)$_y$ (V) for oligomeric, cyclic alumoxanes
wherein x is 1-40, and preferably 10-20;
wherein y is 3-40, and preferably 3-20; and
wherein each $R^a$ is independently selected from a $C_1$-$C_8$alkyl, and preferably each $R^a$ is methyl. In a preferred embodiment, the alumoxane is methylalumoxane (MAO).

In a preferred embodiment, the metallocene catalyst is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula AlR$^b_x$ can be used as additional co-catalyst, wherein each R$^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

Suitable ethylene polymerization includes but is not limited to homopolymerization of ethylene, or copolymerization of ethylene and a higher 1-olefin co-monomer.

As used herein, the term "co-monomer" refers to olefin co-monomers which are suitable for being polymerized with alpha-olefin monomer. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In some embodiments of the present invention, said co-monomer is 1-hexene.

In a preferred embodiment, fraction A of the at least one metallocene-catalyzed polyethylene resin for use in said injection-molded article is an ethylene homopolymer. In a preferred embodiment, fraction B of the at least one metallocene-catalyzed polyethylene resin for use in said injection-molded article is an ethylene copolymer. The term "ethylene copolymer" as used herein is intended to encompass polymers which consist essentially of repeat units deriving from ethylene and at least one other $C_3$-$C_{20}$ alpha olefin co-monomer, preferably the co-monomer is 1-hexene. The term "ethylene homopolymer" as used herein is intended to encompass polymers which consist essentially of repeat units deriving from ethylene. Homopolymers may, for example, comprise at least 99.8% preferably 99.9% by weight of repeats units derived from ethylene.

Preferably, the at least one metallocene-catalyzed polyethylene resin for use in said injection-molded article is prepared in two or more serially connected reactors. In some embodiments, the at least one metallocene-catalyzed polyethylene resin comprises two metallocene-catalyzed polyethylene fractions A and B, wherein each fraction is prepared in different reactors of two reactors connected in series.

The metallocene-catalyzed polyethylene resin is preferably obtained by operating the at least two reactors under different polymerization conditions.

The metallocene-catalyzed polyethylene resin can be prepared out in gas, solution or slurry phase. Slurry polymerization is preferably used to prepare the polyethylene resin composition, preferably in a slurry loop reactor or a continuously stirred reactor.

Preferably, the metallocene-catalyzed polyethylene resin is prepared in two or more serially connected reactors, comprising at least one first and at least one second reactors, preferably loop reactors, more preferably slurry loop reactors, most preferably liquid full loop reactors in the presence of same or different metallocene catalysts. The most preferred polymerization process is carried out in two serially connected slurry loop reactors, advantageously liquid full loop reactors i.e. a double loop reactor.

As used herein, the terms "loop reactor" and "slurry loop reactor" may be used interchangeably herein.

The catalyst is preferably added to the loop reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane.

In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the first and second loop reactors may be connected through means such as a transfer line or one or more settling legs. In some embodiments, the first polyethylene fraction may be transferred from the first loop reactor to the second loop reactor through a transfer line. In some embodiments, the first polyethylene fraction may be discharged in batches, sequentially or continuously from the first loop reactor through one or more settling legs, and transferred to the second loop reactor via a transfer line.

In some embodiments, the at least one metallocene-catalyzed polyethylene resin for use in the injection-molded article, is prepared using a process comprising the steps of:
(a) feeding ethylene monomer, a diluent, at least one metallocene catalyst, optionally hydrogen, and optionally one or more olefin co-monomers into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction; and
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.

In some preferred embodiments, the at least one metallocene-catalyzed polyethylene resin for use in the injection-molded article, is prepared using a process comprising the steps of:
(a) feeding ethylene monomer, a diluent, at least one metallocene catalyst, optionally one or more olefin co-monomers, and optionally hydrogen, into at least one first slurry loop reactor; polymerizing the ethylene monomer, in the presence of the metallocene catalyst, and optional hydrogen, in said first slurry loop reactor to produce a first polyethylene fraction; and
(b) feeding the first polyethylene fraction to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the metallocene catalyzed-polyethylene resin.

In some alternative embodiments, the at least one metallocene-catalyzed polyethylene resin for use in the injection-molded article, is prepared using a process comprising the steps of:
(a) feeding ethylene monomer, a diluent, one or more olefin co-monomers, at least one metallocene catalyst, optionally hydrogen, into at least one first slurry loop reactor; polymerizing the ethylene monomer, and the one or more olefin co-monomers, in the presence of the metallocene catalyst, and optional hydrogen, in said first slurry loop reactor to produce a first polyethylene fraction; and
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.

The polymerization steps can be performed over a wide temperature range. In certain embodiments, the polymerization steps may be performed at a temperature from 20° C. to 125° C., preferably from 60° C. to 110° C., more preferably from 75° C. to 100° C. and most preferably from 78° C. to 98° C. Preferably, the temperature range may be within the range from 75° C. to 100° C. and most preferably from 78° C. to 98° C.

In certain embodiments, the polymerization steps may be performed at a pressure from about 20 bar to about 100 bar, preferably from about 30 bar to about 50 bar, and more preferably from about 37 bar to about 45 bar.

In some embodiments, reactants comprise the monomer ethylene, isobutane as hydrocarbon diluent, a supported metallocene catalyst, and optionally at least one co-monomer such as 1-hexene are used.

In some embodiments, the injection-molded article comprises at least one metallocene-catalyzed polyethylene resin, said at least one resin comprising at least two metallocene-catalyzed polyethylene fractions A and B, wherein the at least one metallocene-catalyzed polyethylene resin comprises: at least 42.0% to at most 49.0% by weight of polyethylene fraction A based on the total weight of the polyethylene resin; and the at least one metallocene-catalyzed polyethylene resin has a density of at least 0.942 to at most 0.950 g/cm$^3$ as measured according to ISO 1183 at 23° C.; a melt index MI2 of at least 1.5 g/10 min to at most 2.5 g/10 min as determined according to ISO 1133, condition D, at 190° C. and under a load of 2.16 kg.

In a preferred embodiment, the injection-molded article comprises at least one metallocene-catalyzed polyethylene resin comprising two polyethylene fractions A and B, fraction B having a higher molecular weight and a lower density than fraction A, with each fraction being prepared in different reactors of two slurry loop reactors connected in series. The molecular weight of the fractions prepared in each of the reactors can be adjusted by known techniques such as varying the amount of hydrogen used. The density of the fractions prepared in each of the reactors can be adjusted by known techniques such as varying the amount of co-monomer used.

In some embodiments, the metallocene-catalyzed polyethylene resin has a melt index MI2 as measured on pellets of at least 1.4 g/10 min to at most 2.5 g/10 min, preferably the polyethylene resin has a melt index MI2 of at least 1.4 g/10 min to at most 2.4 g/10 min, preferably of at least 1.4 g/10 min to at most 2.2 g/10 min, as determined according to ISO 1133, condition D, at 190° C. and under a load of 2.16 kg.

In some embodiments, the metallocene-catalyzed polyethylene resin has an HLMI of at least 53.0 g/10 min as measured on pellets according to ISO 1133:1997 condition G at 190° C. and under a load of 21.6 kg. Preferably the polyethylene resin has an HLMI of at least 58.0 g/10 min, preferably of at least 63.0 g/10 min, preferably of at least 68.0 g/10 min, preferably of at least 73.0 g/10 min, preferably of at least 75.0 g/10 min.

As used herein, the molecular weight ($M_n$ (number average molecular weight), $M_w$ (weight average molecular weight) and $M_z$ (z average molecular weight)) and molecular weight distributions D ($M_w/M_n$), and D' ($M_z/M_w$) were determined by size exclusion chromatography (SEC) and in particular by gel permeation chromatography (GPC).

For metallocene-catalyzed polyethylene resin comprising two fractions A and B, wherein fraction B is prepared in the second reactor, the density of fraction B is linked to that of the density of fraction A by the following expression:

$$d = W_A * d_A + (1 - W_A) * d_B$$

wherein d is the density of the final polyethylene fluff, $W_A$ is the weight fraction of fraction A, $d_A$ is the density of fraction A, $d_B$ is the density of fraction B, and wherein the sum of both fractions A and B by weight ($W_A + W_B$) is 1. A similar formula can be expressed for any polyethylene resin comprising more than two fractions.

For metallocene-catalyzed polyethylene resin comprising two fractions A and B, the HLMI of fraction B is linked to that of the HLMI of fraction A by the following expression:

$$\text{Log HLMI}^{final} = W_A \times \text{Log HLMI}_A + W_B \times \text{Log HLMI}_B$$

wherein $\text{LogHLMI}^{final}$ is the LogHLMI of the final polyethylene fluff, $W_A$ is the weight fraction of fraction A, $\text{LogHLMI}_A$ is the Log HLMI of fraction A, $\text{LogHLMI}_B$ is the LogHLMI of fraction B, and wherein the sum of both fractions A and B by weight ($W_A + W_B$) is 1. A similar formula can be expressed for any polyethylene resin comprising more than two fractions.

For metallocene-catalyzed polyethylene resin comprising two fractions A and B, the MI2 of fraction B is linked to that of the MI2 of fraction A by the following expression:

$$\text{Log MI2}^{final} = W_A \times \text{Log MI2}_A + W_B \times \text{Log MI2}_B$$

wherein $\text{Log MI2}^{final}$ is the Log MI2 of the final polyethylene fluff, $W_A$ is the weight fraction of fraction A, $\text{Log MI2}_A$ is the Log MI2 of fraction A, $\text{Log MI2}_B$ is the Log MI2 of fraction B, and wherein the sum of both fractions A and B by weight ($W_A + W_B$) is 1. A similar formula can be expressed for any multimodal polyethylene resin comprising more than two fractions.

The polyethylene resin may be compounded with one or more additives, in particular additives such as, by way of example, processing aids, mold-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plasticizers, colorants/pigments/dyes, sealant resins and mixtures thereof. Illustrative pigments or colorants include titanium dioxide and carbon black. Specific examples of additives include lubricants and mold-release agents such as calcium stearate, zinc stearate, SHT, antioxidants such as Irgafos®168, Irganox®1010, and Irganox®1076, anti-slip agents such as erucamide, light stabilizers such as Tinuvin®622, Tinuvin®326 and Cyasorb THT®4611, ionomers, and nucleating agents such as Milliken HPN20E™, conductive carbon black and carbon nanotubes.

The present invention also encompasses an injection-molding process for preparing an injection-molded article according to the invention, comprising the steps of a) providing at least one metallocene-catalyzed polyethylene resin as described herein; and b) injection-molding said polyethylene resin into an article.

The resin can be processed on conventional injection moulding machines. The finish on the moldings obtained is homogeneous and can be improved further by increasing the rate of injection or raising the mould temperature.

Articles obtained by the injection-molding process according to the invention show low warpage, low sagging and low deformation. They also benefit from improved stiffness and rigidity; as well as good tensile properties.

When the article is obtained by sealing together two injection moulded half shells, the very low warpage of the resin is particularly advantageous, because said half shells result to be easily sealable due to their good planarity.

The articles obtained by injection-molding include tanks, drums, containers, bins, vats, jerrycans, cans, cisterns, boxes, and other components such as connectors, caps or closures, or any other injected components etc.

In some preferred embodiment, said injection-moulded article can be a container, in particular a tank, such as automotive fuel tanks, SCR (Selective Catalytic Reduction) or AdBlue® tanks.

Such injection-moulded article can also be an inner part of a tank e.g. a slosh baffle, a connector, a pillar, and the like.

The invention will now be illustrated by the following, non-limiting illustrations of particular embodiments of the invention.

EXAMPLES

Test Methods:

The density was measured according to the method of standard ISO 1183:2 at a temperature of 23° C.

The melt index MI2 was measured according to the method of standard ISO 1133:1997, condition D, at 190° C. and under a load of 2.16 kg.

The melt index MI105 was measured according to the method of standard ISO 1133:1997, condition D, at 190° C. and under a load of 2.16 kg, and a die with the following features: diameter of 1.05 mm and height of 4 mm.

High load melt index HLMI was measured according to the method of standard ISO 1133:1997, condition G, at 190° C. and under a load of 21.6 kg.

The melt index MI5 was measured according to the method of standard ISO 1133:1997, condition T, at 190° C. and under a load of 5 kg.

The molecular weight ($M_n$ (number average molecular weight), $M_w$ (weight average molecular weight) and $M_w$ (z average molecular weight)) and molecular weight distributions D (Mw/Mn), and D' (Mz/Mw) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 $cm^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$=0.965909×$\log_{10}(M_{PS})$−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_Z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Rheology long chain branching index a $g_{rheo}$ was measured according to the formula, as described in WO 2008/113680:

$$g_{rheo}(PE) = \frac{M_w(SEC)}{M_w(\eta_o, MWD, SCB)}$$

wherein Mw (SEC) is the weight average molecular weight obtained from size exclusion chromatography expressed in kDa;
and wherein Mw ($\eta_0$, MWD, SCB) is determined according to the following, also expressed in kDa:

$M_w(\eta_0,MWD,SCB)$=exp(1.7789±0.199769 Ln $M_n$+0.209026(Ln $\eta_0$)±0.955(ln ρ)−0.007561(Ln $M_z$)(Ln $\eta_0$)+0.02355(ln $M_z$)$^2$)

wherein the zero shear viscosity $\eta_0$ in Pa·s is obtained from a frequency sweep experiment combined with a creep experiment, in order to extend the frequency range to values down to $10^{-4}$ $S^{-1}$ or lower, and taking the usual assumption of equivalence of angular frequency (rad/s) and shear rate; wherein zero shear viscosity $\eta_0$ is estimated by fitting with Carreau-Yasuda flow curve (η-W) at a temperature of 190° C., obtained by oscillatory shear rheology on ARES-G2 equipment (manufactured by TA Instruments) in the linear viscoelasticity domain; wherein circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%; wherein the apparatus used is an AR-G2 manufactured by TA instruments.

Dynamic rheometry analyses (RDA) were performed on an ARES rheometer from TA Instruments (Waters SA), measured on parallel plates with a diameter of 25 mm. Temperature was 190° C., deformation was 10%, and the scanning frequency was from 0.1 to 300 rad/s.

Bell ESCR was measured according to ASTM D 1693-method B at 50° C. using 10% or 100% Igepal CO-630 as a chemical agent (wherein Igepal CO-630 (CAS Number 68412-54-4) is commercially available from Rhodia).

FNCT: The slow crack growth resistance was tested by a full notch creep test (FNCT) according to ISO DIS 16770-3 in which the time for failure was recorded for a circumferentially notched (1600 pm depth) specimen having a 10 mm×10 mm cross section, taken from compressed-plates (compression from the melt at a cooling rate of 15° C./min.). In one experiment, the specimens are placed in a surfactant solution of 2 wt % (in water) Arkopal N100, at a temperature of 80° C., for an extended period of time, and subjected to a tensile stress equal to 4 MPa. In another experiment, the specimens are placed in a surfactant solution of 2 wt % (in water) Arkopal N100, at a temperature of 50° C., for an extended period of time, and subjected to a tensile stress equal to 6 M Pa.

Flexural modulus was measured according to ISO 178 three-points bending test at 23° C.

Tensile modulus was measured according to ISO 527-2 at 23° C.

Charpy impact strength was measured according to ISO 179 at 23° C., −15° C. and −30° C.

Determination of the shrinkage on injected squares: Squares of 61 mm nominal length (mould dimension) have been injected with a 60 ton Netstal injection molding machine. The actual dimensions are measured after cooling in each direction and the shrinkage vs mould is calculated in %.

Example 1: Preparation of Resins

Polyethylene resins: five resins (Resins 1, 2, 3, 4, and 5) having bimodal molecular weight distribution were prepared in two serially connected slurry loop reactors (double loop reactor) under the conditions given below in Table 1. The polyethylene resins (Resins 1, 2, 3, 4 and 5) were prepared with dichlorinated ethylene bis(tetrahydroindenyl) zirconium, methylalumoxane (MAO) supported catalyst. The silica support was sold by PQ Corporation under the name ES70W. It had the following specifications: specific surface area=291 $m^2$/g; D50=40 μm; porous volume=1.6 ml/g. The supported metallocene catalyst comprised 30% in weight of MAO (sold by Albemarle) and 2% in weight of metallocene. No hexene was used in the first reactor, no degassing took place. Pelletization was performed on a ZSK58 twin screw extruder.

TABLE 1

| | | | Resin 1 | Resin 2 | Resin 3 | Resin 4 | Resin 5 |
|---|---|---|---|---|---|---|---|
| | Operating conditions and analytical results for each of the resins | | | | | | |
| First reactor operating conditions | Temperature. | (° C.) | 95 | 95 | 95 | 95 | 95 |
| | Ethylene | (kg/h) | 26.0 | 25.7 | 23.0 | 23.0 | 23.0 |
| | 1-hexene | (kg/h) | 0 | 0 | 0 | 0 | 0 |
| | $H_2$ | (Nl/h) | 67 | 75 | 66 | 63 | 64 |
| | Isobutane | (kg/h) | 50 | 50 | 50 | 50 | 50 |
| Contribution | First reactor | (wt %) | 47.4 | 48.0 | 43.5 | 43.8 | 43.8 |
| First reactor Analytical results | MI105 | (g/10 min) | 26 | 28 | 27 | 23 | 25 |
| | MI2 | (g/10 min) | 205 | 218 | 211 | 161 | 195 |
| | Density | (g/cm$^3$) | 0.971 | 0.974 | 0.974 | 0.974 | 0.971 |
| Second reactor operating conditions | Temperature | (° C.) | 90.0 | 90.0 | 90.0 | 90.0 | 90.0 |
| | Ethylene | (kg/h) | 25.0 | 25.3 | 28.0 | 28.0 | 28.0 |
| | 1-hexene | (Kg/h) | 3.1 | 4.62 | 4.53 | 3.37 | 3.50 |
| | $H_2$ | (Nl/h) | 5.0 | 5.2 | 7.4 | 8.5 | 9.0 |
| | Isobutane | (kg/h) | 45 | 45 | 45 | 45 | 45 |
| | calculated density fraction reactor 2 | (g/cm$^3$) | 0.928 | 0.921 | 0.921 | 0.925 | 0.927 |
| Analytical results (pellets) | MI2 | (g/10 min) | 2.03 | 1.9 | 1.8 | 1.8 | 2.1 |
| | MI5 | (g/10 min) | 6.9 | 6.4 | 6.0 | 6.2 | 7.2 |
| | HLMI | (g/10 min) | 74 | 87 | 74 | 76 | 87 |
| | SR2 | | 36 | 47 | 42 | 42 | 41 |
| | SR5 | | 11 | 14 | 12 | 12 | 12 |
| | Density | (g/cm$^3$) | 0.949 | 0.946 | 0.944 | 0.947 | 0.946 |
| GPC (PELLETS) | Mn | (Da) | 14849 | 14580 | 15729 | 16049 | 15756 |
| | Mw | (Da) | 69336 | 75030 | 74957 | 74002 | 71141 |
| | Mz | (Da) | 181113 | 216086 | 199790 | 195280 | 186080 |
| | D | | 4.7 | 5.1 | 4.8 | 4.6 | 4.5 |
| | D' | | 2.6 | 2.9 | 2.7 | 2.6 | 2.6 |

Example 2: Injection Grades for SCR/AdBlue Tank Application: Comparing Lumicene M5220 vs Examples According to the Invention Material Used:

Lumicene® M5220, commercially available from TOTAL Refining & Chemicals, is a metallocene high density polyethylene having a density of 0.952 g/cm$^3$ (ISO 1183), a melt index (190° C./2.16 kg) of 2.0 g/10 min (ISO 1133-D), an HLMI (ISO 1183) of 66.8 g/10 min and Mw/Mn of 4.6.

The properties of the resins 1-5 used are shown in Table 1 of Example 1.

ESCR and FNCT analyses were performed and compared with the results obtained when using a commercially-available injection-grade high density metallocene-catalyzed bimodal polyethylene resin Lumicene® mPE M5220 from Total Refining & Chemicals, having an MI2 (ISO 1133/D 2.16 kg—190° C.) of 2.0 g/10 min, and a density of 0.952 g/cm$^3$ (ISO 1183). The ESCR and FNCT results are shown in Table 2.

TABLE 2

| | | | Result ESCR/FNCT | | | | | |
|---|---|---|---|---|---|---|---|---|
| | | | Lumicene M5220 | Resin 1 | Resin 2 | Resin 3 | Resin 4 | Resin 5 |
| Bell ESCR in Igepal | 100% 10% | ASTM D1693 | F50 = 240 h F50 = 30 h | F0 > 1000 h F50 = 157 h | F0 > 1000 h F0 > 1000 | F0 > 1000 h F0 > 1000 | F0 > 1000 h F50 = 199 | F0 > 1000 h F50 = 216 |
| FNCT in Arkopal N-100 (80° C., 4 MPa) | 2% | ISO 16770 | 2.3 h | 7.4 h | (29.1 h*) | (24.5 h) | 8.1 h | (6.6 h) |
| FNCT in Arkopal N-100 (50° C., 6 MPa) | 2% | ISO 16770 | (13.4 h) | 41.6 h | 169.5 h | 142.9 h | 47.2 h | 38.4 h |

X h = measured (Y h) = calculated (rule of three based on ratio of test values for resin 4 Example* 29.1 = 8.1*169.5/47.2)

Impact and Modulus analyses were performed. The results are shown in Table 3.

TABLE 3

Results Impact

|  | Temp. | Standard | Units | Lumicene M5220 | Resin 1 | Resin 2 | Resin 3 | Resin 4 | Resin 5 |
|---|---|---|---|---|---|---|---|---|---|
| CHARPY impact | −30° C. | ISO 179 | kJ/m² | 5.2 | 5.0 | 4.7 | 4.7 | 4.4 | 4.3 |
| Flexural Modulus | 23° C. | ISO 178 | MPa | 1066 | 997 | 925 | 904 | 922 | 916 |
| Tensile Modulus | 23° C. | ISO 527 | MPa | 970 | 887 | 878 | 850 | 934 | 885 |

RDA analyses were performed. The RDA results are shown in FIG. 1, which plots viscosity (Pa·s) of each resin as a function of shear rate (Rad/s).

Figure 2:
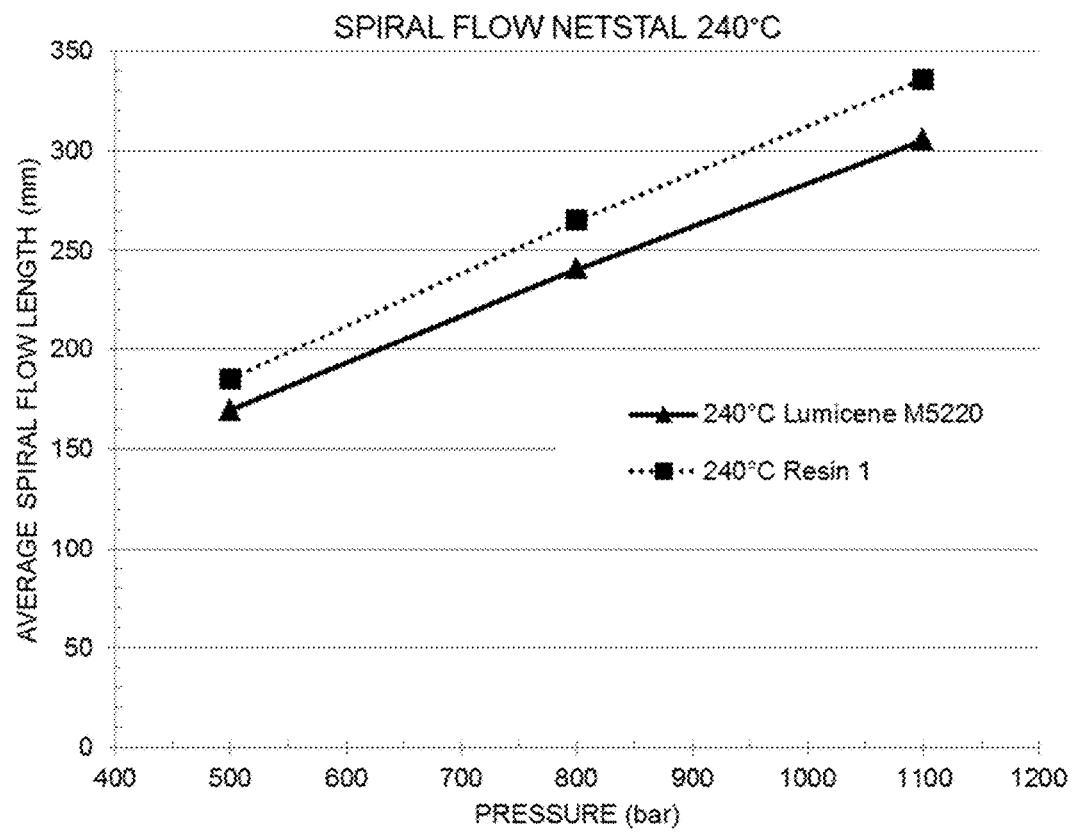
FIG. 2 represents a graph plotting spiral flow length (SFL) as a function of increasing injection pressure for a polyethylene article according to embodiments of the present invention, and two comparative examples.
Figure 3:
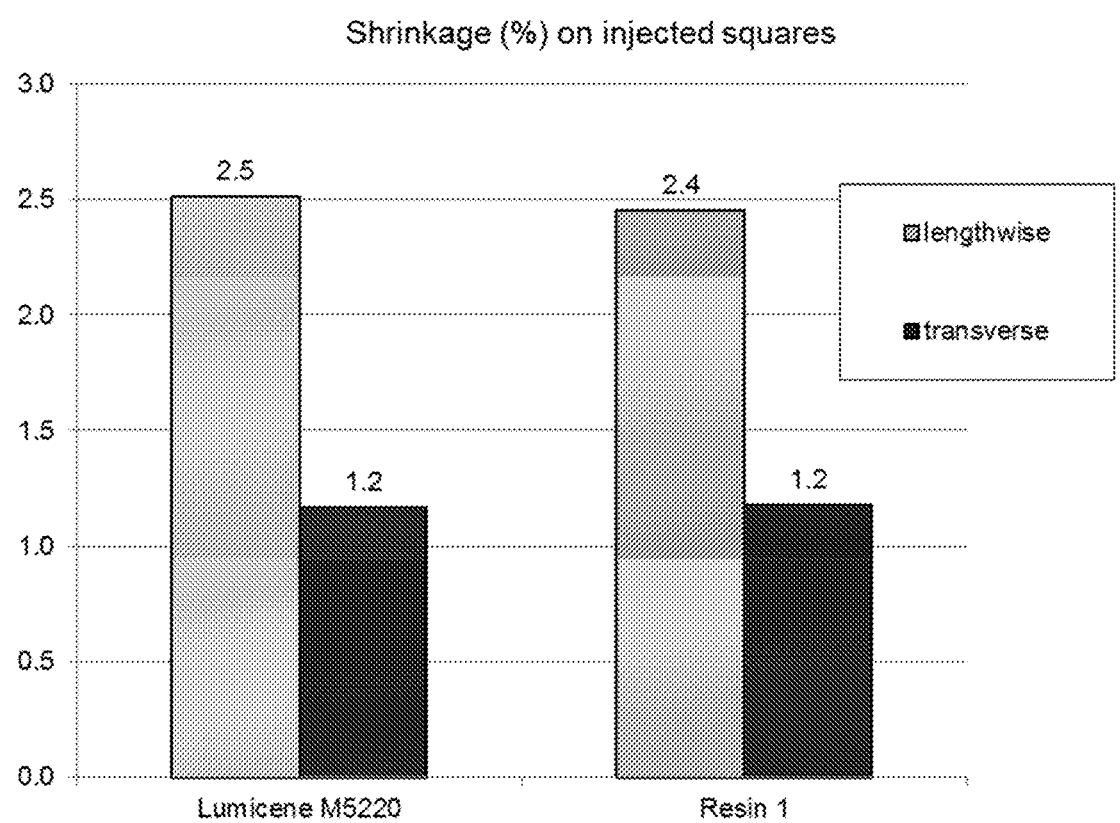
FIG. 3 represents a graph plotting the % of shrinkage of injected squares comprising either polyethylene resins according to embodiments of the invention or comparative resins.

Injectability analyses were performed. Non-isothermal tests that simulated the injection molding process have been used for evaluating resin processability in injection molding processes. The spiral flow test comprised measuring the spiral flow length before freeze-up of melted polymer injection-molded into a standard mold under standard filling conditions. A standard moldability test has been carried out. Melted polymer was injected into a standard mold having a simple spiral geometry involving a long flow path. The moldability index was defined as the flow length, meaning the length of mold filled before freeze-up under standard filling conditions. The spiral flow lengths (SFL) have been measured at a temperature of 240° C. and respectively under injection pressures of 500, 800 and 1100 bars. Spiral flow was determined on a 60 ton Netstal injection molding machine with a screw having a diameter of 32 mm and a L/D ratio of 25. The injection pressure has been varied. Spiral flow lengths (SFL) for several resins have been reported as a function of increasing injection pressure at a temperature of 240° C. and are shown in FIG. 2 which plots spiral flow length (SFL) as a function of increasing injection pressure. Shrinkage of injected squares was evaluated following the method described herein above. The results are presented in FIG. 3.

The invention claimed is:

1. An injection-molded article, comprising at least one metallocene-catalyzed polyethylene resin comprising at least two metallocene-catalyzed polyethylene fractions A and B, wherein the at least one metallocene-catalyzed polyethylene resin comprises
at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133:1997, condition D, at 190° C. and under a load of 2.16 kg; and
wherein the at least one metallocene-catalyzed polyethylene resin has a density of at least 0.940 g/cm³ to at most 0.950 g/cm³ as measured on pellets according to ISO 1183 at 23° C.; a melt index MI2 of at least 1.4 g/10 min to at most 2.5 g/10 min as measured on pellets according to ISO 1133:1997, condition D, at 190° C. and under a load of 2.16 kg.

2. The injection-molded article of claim 1, wherein the at least one metallocene-catalyzed polyethylene resin has a molecular weight distribution $M_w/M_n$ of at least 4.0 to at most 6.0, with $M_w$ being the weight-average molecular weight and $M_n$ being the number-average molecular weight.

3. The injection-molded article of claim 1, wherein the at least one metallocene-catalyzed polyethylene resin has an HLMI of at least 50.0 g/10 min, as measured on pellets according to ISO 1133:1997 condition G at 190° C. and under a load of 21.6 kg.

4. The injection-molded article of claim 1, wherein fraction A of the at least one metallocene-catalyzed polyethylene resin has a density at least 0.005 g/cm³ higher than the density of the at least one metallocene-catalyzed polyethylene resin.

5. The injection-molded article of claim 1, wherein fraction A of the at least one metallocene-catalyzed polyethylene resin has a density as measured on the fluff of at least 0.960 g/cm³, as measured according to ISO 1183 at 23° C.

6. The injection-molded article of claim 1, wherein the at least one metallocene-catalyzed polyethylene resin has a multimodal molecular weight distribution, and wherein said at least one metallocene-catalyzed polyethylene resin has a bimodal molecular weight distribution.

7. The injection-molded article of claim 1, wherein each fraction of said at least one metallocene-catalyzed polyethylene resin is prepared in different reactors of at least two reactors connected in series.

8. The injection-molded article of claim 1, wherein the at least one metallocene-catalyzed polyethylene resin is prepared using a process comprising the steps of:
   (a) feeding ethylene monomer, a diluent, at least one metallocene catalyst, optionally hydrogen, and optionally one or more olefin co-monomers into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction A; and
   (b) feeding the first polyethylene fraction A to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.

9. The injection-molded article of claim 1, wherein said at least one metallocene-catalyzed polyethylene resin is prepared using a process comprising the steps of:
   (a) feeding ethylene monomer, a diluent, at least one metallocene catalyst, optionally hydrogen, and optionally one or more olefin co-monomers, into at least one first slurry loop reactor; polymerizing the ethylene monomer, in the presence of the metallocene catalyst, and optional hydrogen, in said first slurry loop reactor to produce a first polyethylene fraction A; and (b) feeding the first polyethylene fraction A to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the metallocene catalyzed-polyethylene resin.

10. The injection-molded article of claim 1, wherein fraction A of said at least one metallocene-catalyzed polyethylene resin is an ethylene homopolymer and fraction B of said at least one metallocene-catalyzed polyethylene resin is an ethylene copolymer.

11. The injection-molded article of claim 1, wherein said at least one metallocene-catalyzed polyethylene resin is prepared using a process comprising the steps of:
    (a) feeding ethylene monomer, a diluent, at least one metallocene catalyst, one or more olefin co-monomers, and optionally hydrogen, into at least one first slurry loop reactor; polymerizing the ethylene monomer, in the presence of the metallocene catalyst, and optional hydrogen, in said first slurry loop reactor to produce a first polyethylene fraction; and
    (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.

12. The injection-molded article of claim 1, wherein the article is a tank, a drum, a container, a bin, a vat, a jerrycan, a can, a cistern, or slosh baffle, a pillar, a connector, or a cap or closure.

13. The injection-molded article of claim 1, wherein the article is an automotive fuel tank.

14. The injection-molded article of claim 1, wherein the article is a Selective Catalytic Reduction (SCR) tank.

15. A process for preparing an injection-molded article, comprising the steps of a) providing at least one metallocene-catalyzed polyethylene resin comprising at least two metallocene-catalyzed polyethylene fractions A and B, wherein the at least one metallocene-catalyzed polyethylene resin comprises
    at least 40% to at most 50% by weight of polyethylene fraction A based on the total weight of the at least one metallocene-catalyzed polyethylene resin, wherein fraction A has a melt index MI2 of at least 100.0 g/10 min as determined according to ISO 1133:1997, condition D, at 190° C. and under a load of 2.16 kg; and
    wherein the at least one metallocene-catalyzed polyethylene resin has a density of at least 0.940 g/cm$^3$ to at most 0.950 g/cm$^3$ as measured on pellets according to ISO 1183 at 23° C.; a melt index MI2 of at least 1.4 g/10 min to at most 2.5 g/10 min as measured on pellets according to ISO 1133:1997, condition D, at 190° C. and under a load of 2.16 kg; and b) injection-molding said polyethylene resin into an article.

* * * * *